Nov. 8, 1927.  1,648,056
R. B. OTWELL
STREET CLEANING ATTACHMENT FOR TRACTORS
Filed Sept. 4, 1923   2 Sheets-Sheet 1
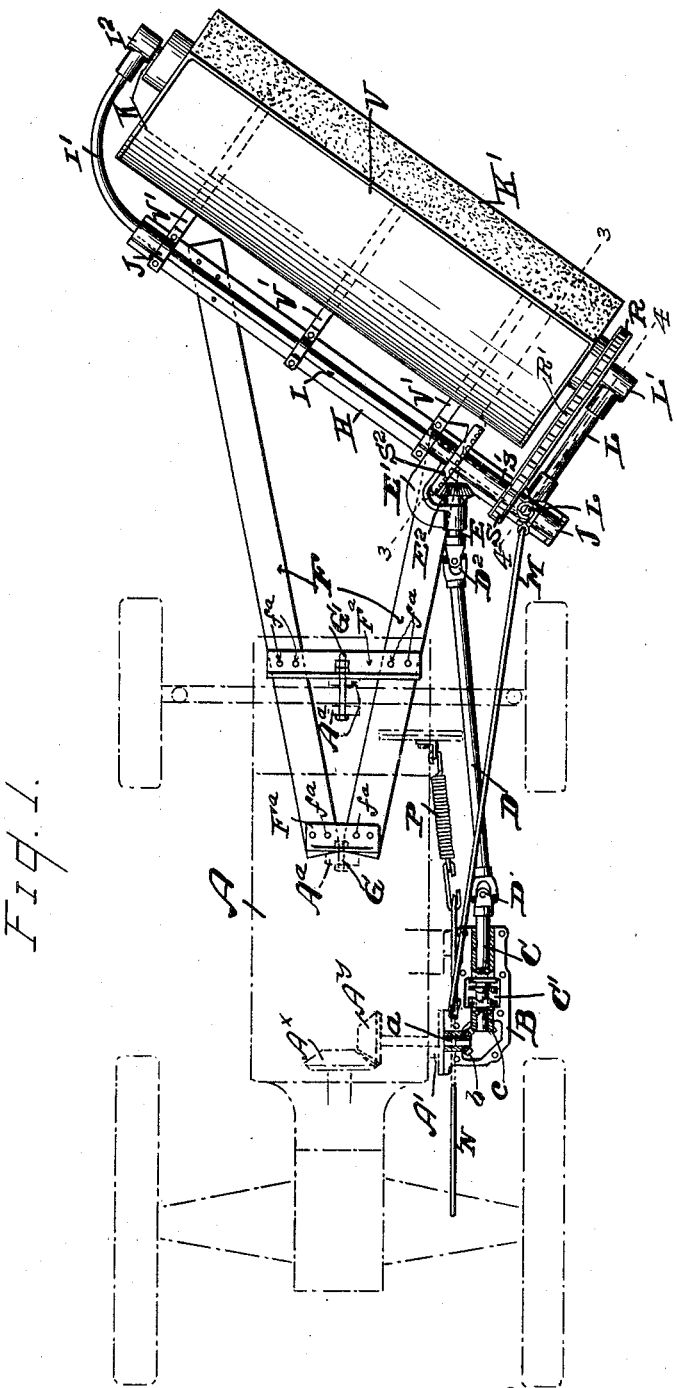
Inventor
Ralph B. Otwell
By J. E. Thomas
Attorney Nov. 8, 1927.
R. B. OTWELL
1,648,056
STREET CLEANING ATTACHMENT FOR TRACTORS
Filed Sept. 4, 1923   2 Sheets-Sheet 2
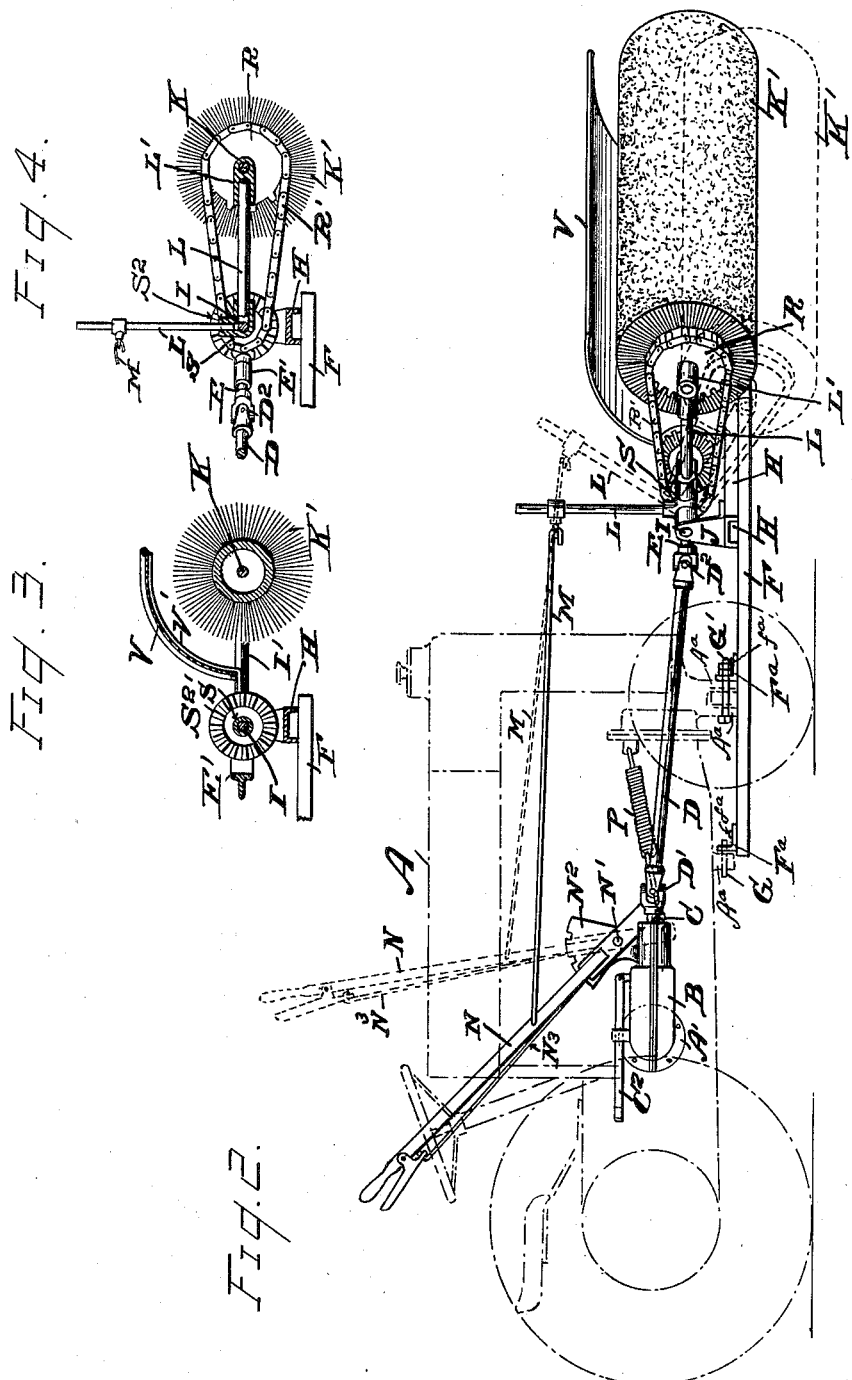
Inventor
Ralph B. Otwell
By J. E. Thomas
Attorney Patented Nov. 8, 1927.

1,648,056

UNITED STATES PATENT OFFICE.

RALPH B. OTWELL, OF DETROIT, MICHIGAN.

STREET-CLEANING ATTACHMENT FOR TRACTORS.

Application filed September 4, 1923. Serial No. 660,740.

This invention relates to a sidewalk or street sweeping attachment for tractors.

One object of the invention is to provide a unitary device adapted for attachment to a well known tractor in such manner that it may be driven directly from the take-off gear of the tractor while permitting the ready adjustment of the rotating brush to effect the sweeping of road or sidewalk, or to a raised position out of contact therewith.

Another object of the invention is to connect the frame of the attachment to the front axle assembly of the tractor so that the brush journaled in the frame of the attachment will follow the inclination of the front axle of the tractor as it tilts to conform to the inclination of the road surface.

Another feature of the invention consists in so mounting the sweeping unit that its draft strain may be directed in line with the longitudinal plane of the tractor to eliminate so far as possible any side stress upon the latter.

With the foregoing and other objects in view which will appear as the description proceeds the invention further resides in the general combination and arrangement of parts and details of construction hereinafter described and claimed, it being understood that changes may be made in the precise embodiment of the invention herein disclosed without departing from the spirit of the same.

In the drawings accompanying this specification:

Figure 1 is a plan view of the device—with parts broken away—showing the tractor in dot and dash lines.

Figure 2 is a side elevation of the device with the tractor in dot and dash lines, showing the rotatable brush raised, and in dash lines the rotatable brush and its operating parts lowered,—as when cleaning a sidewalk or pavement.

Figure 3 is a fragmentary detail and sectional view taken on or about line 3—3 of Figure 1.

Figure 4 is a fragmentary detail and sectional view taken on or about line 4—4 of Figure 1.

The drawings indicate the well known "Fordson" tractor including the engine housing A and also including the take-off or power gear $A^x$, disposed in its usual position. A main supporting casing $A^1$ is bolted to the engine housing of the tractor as a housing for a power take-off shaft $a$, fitted with a gear $A^y$, in mesh with the power gear $A^x$. A transverse casing extension B is bolted to the casing $A^1$ to receive a transmission shaft C, journaled in the extension on which is a loosely mounted beveled pinion $c$ in mesh with the beveled pinion $b$, keyed to the power take-off shaft. D, is a propeller shaft connected at one end to the transmission shaft C by a universal joint $D^1$, and at the other end by a universal joint $D^2$ with a shaft E, journaled in a bracket $E^1$, secured to an inverted channel bar H, which is in turn bolted respectively to the forward ends of the side sills of a horizontal A-shaped frame F. The A-shaped frame F is secured to brackets $A^a$, $A^a$, extending downwardly from the underside of the tractor by longitudinally aligned bolts G and $G^1$, projecting through the transverse members $F^a$, $F^a$, bolted to the side sills of the A-shaped frame. In assembling the A-shaped frame with the tractor, the bolts $f^a$ connecting the transverse members and the side sills of the A-shaped frame together are first slightly loosened,—the bolts G and $G^1$ supported in the brackets $A^a$, $A^a$, are then connected with the transverse member $F^a$, $F^a$;—the bolts $f^a$, $f^a$, connecting the transverse members $F^a$, $F^a$, with the side sills of the A-shaped frame are now retightened, thereby drawing the side sills into impinging contact with the front axle of the tractor and thus making the A-shaped frame and the front axle assembly of the tractor a unit. It will now be apparent that any inclination of the axle and wheels of the tractor in traversing a road surface will be reflected in the A-shaped frame,—therefore the rotatable brush journaled in the latter,—following the inclination of the axle, will insure perfect contact between the brush and the road surface throughout the length of said brush.

Located above the A-shaped frame and parallel with the bar H is a shaft I, journaled in suitable bearings J carried by the bar, one end of the shaft being given an arcuate form—indicated at $I^1$—to which is fitted a bearing $I^2$ to receive the shaft K of the rotatable brush $K^1$,—journaled at its opposite end in a bearing $L^1$ carried by a rocker arm L, mounted upon the shaft I. A connecting link M, is secured at one end to the rocker arm L and at the other end to a manually operated lever N, pivoted at N¹ to a segment N², integral with the casing extension B. A manually operated rod N³ is provided for releasing the usual dog (not shown) engaging the teeth of the segment to secure the lever in its adjusted position. A spring P connected with the lever N and with a bracket secured to the frame of the machine counterbalances the weight of the brush so that the latter while bearing upon the road surface will not be subjected to excessive wear. Mounted upon the brush shaft K is a sprocket gear R connected by a sprocket chain R¹ with a sprocket gear S carried by a short tubular shaft S¹ loosely sleeved upon the shaft I. The tubular shaft S¹ is driven by means of the bevel gear S² in mesh with the bevel pinion E² on the shaft E in turn coupled to the propeller shaft. A guard V partially encircles the rotatable brush and is supported by brackets V¹ secured to the inverted channel bar H. A suitable clutch member C¹, keyed to the shaft C, and located within the transverse housing B, is actuated by a foot lever C² and serves to operably connect the shaft C with the take-off shaft $a$, through the "tight and loose" pinions $b$ and $c$ carried by the respective shafts.

As a result of the construction shown a unitary device is provided adapted to be secured to the so called "Fordson" tractor in such manner as to communicate its draft to the medial longitudinal axis of the tractor, and is also connected with the front axle assembly of the tractor to oscillate therewith so that the rotatable brush will follow any variations in the road surface;—it being also adjustable to carry the rotatable brush into an operative or inoperative position.

Having now indicated the several parts by reference letters, the construction and operation of the device will be readily understood.

When it is desired to sweep the walk or street the prime mover (not shown) is first started in the usual manner. The manually operated lever N is then shifted to the position indicated in dotted lines in Figure 2,—the link M tilting the rocker bar L and thereby the rotatable brush into contact with the road surface as indicated by the dotted lines—the brush being actuated through the gearing connecting it with the power take-off shaft. If it is desired to stop the rotation of the brush while the motor is operating, the clutch C¹ is actuated by means of its foot controlling lever C², thereby disconnecting the sweeping mechanism from the power take-off shaft. If it is desired to raise the brush out of contact with the road surface, the manually operated lever is shifted to the position indicated in full lines in Figure 2, thereby raising the brush free from contact with the road surface.

Having thus described my invention what I claim is:

1. In a device of the character described, a wheeled motor vehicle, including an engine housing and also a power take-off shaft, a frame pivoted to the underside of the engine housing on a horizontally mounted pivot disposed midway between the sides of the engine housing, said frame being also rigidly connected with the front axle of the vehicle for oscillatory movement therewith, a rotatable brush carried by the outer ends of said frame, means for manually raising and lowering said brush, a driving means for rotating said brush, and a manually operated clutch for releasing or connecting said driving means with the power take-off shaft.

2. In a device of the character described, a wheeled motor vehicle including an engine housing and a laterally extending casing connected to the housing, a power take-off shaft extending into said casing, a transmission shaft journaled in said casing, gears to connect the power take-off shaft and the transmission shaft, a slidable clutch on said transmission shaft connectible to one of said gears, means for manually controlling the movement of the clutch, a propeller shaft connected with the transmission shaft, a horizontal frame secured to the underside of the engine housing between the front and rear axles of the vehicle and extending forwardly of the vehicle, a rock shaft journaled upon said frame, a rocker arm mounted on the rock shaft, a rotatable brush carried by the rock shaft, a driving connection between the rotatable brush and the propeller shaft, and means for rocking the rocker arm and rock shaft.

3. In a device of the character described, a wheeled motor vehicle including an engine housing provided with a lateral extension, a power take-off shaft extending into said extension, a transmission shaft extending into said lateral extension of the housing gears for operatively connecting said shafts together, a clutch in said extension operable for releasing or connecting the gear connection between the power shaft and the transmission shaft, an A-shaped frame adapted to extend in front of the vehicle, means for pivoting said frame to the underside of the engine housing with the pivot disposed on a line midway between the sides of the engine housing, said frame being also rigidly connected with the front axle of the vehicle, whereby the frame may have an oscillatory movement coincident with the front axle of the vehicle, a rotatable brush, means for supporting said rotatable brush upon said frame, a propeller shaft having a flexible connection with the transmission shaft, a flexible driving connection between the propeller shaft and the rotatable brush, and means for manually moving the brush into or out of contact with the road surface.

4. In a device of the character described, a motor driven wheeled vehicle including an engine housing provided with a lateral extension forming a casing, a power take-off shaft extending into the casing, a drive shaft extending into said casing and operatively connected to the power take-off shaft, an A-shaped frame pivoted to the underside of the engine housing and extending forwardly in front of the vehicle and at its inner end pivoted to the underside of the engine housing on a line midway between the sides thereof and intermediate its inner and outer ends and having connection with the front axle of the vehicle to oscillate therewith, means for supporting a rotatable brush upon the forward end of said frame, means for raising and lowering the brush with reference to the road surface, and a clutch adapted to establish or release the driving connection between the power take-off shaft and the brush.

5. In a machine of the character described, a tractor having a depending bracket in the rear of the front axle, a frame pivoted to said bracket and projecting forwardly of the tractor and having connection with the front axle of the tractor, a rock shaft mounted on the frame, a brush rotatably carried by said rock shaft, means whereby to rotate the brush, and means whereby to rock the rock shaft to raise and lower the brush.

6. In a machine of the character described, a tractor, an A-shaped frame having its minor end pivotally connected to the tractor in the rear of the front axle and intermediate its ends having connection with the front axle, one of the legs of the A-shaped frame being longer than the other, a rock shaft mounted at the forward end of the A-shaped frame and disposed obliquely to the rigid front axle of the tractor, a brush rotatably carried by said rock shaft, means whereby to rotate the brush, means whereby to rock the rock shaft to raise and lower the brush.

7. In a machine of the character described, a tractor, a frame pivoted to the tractor in the rear of the front axle and also having connection with the front axle and projecting forwardly of the tractor, a rock shaft mounted on the frame and at one end being curved forwardly, an arm extending forwardly from the opposite end of the rock shaft, a brush rotatably carried by said rock shaft between said forwardly curved end and said arm, means whereby to rotate the brush, a rocker arm connected to the rock shaft, an operating lever mounted on the tractor and a connection between the lever and rocker arm whereby to rock the rock shaft and thereby raise and lower the brush.

8. In a device of the character described including an engine housing, a rotary brush extending upon an incline across the front of the tractor, a frame for supporting said rotary brush, the frame being connected to the front axle of the tractor and also pivotally connected to the underside of the engine housing of the tractor substantially midway of the sides of the engine housing to permit oscillatory movement of the brush with the axle whereby the brush may follow the contour of the road surface and thus relieve the brush from excessive wear, means for manually raising and lowering the brush, and means for rotating the brush.

In testimony whereof, I sign this specification.

RALPH B. OTWELL.